United States Patent [19]
Driver

[11] Patent Number: 5,174,246
[45] Date of Patent: Dec. 29, 1992

[54] SECURITY HITCH FOR ANIMAL LEASHES

[76] Inventor: Wilfred D. Driver, 357 East 28th Street, Hamilton, Ontario, Canada, L8V 3J7

[21] Appl. No.: 754,595

[22] Filed: Sep. 4, 1991

[51] Int. Cl.[5] ............................................. A01K 1/00
[52] U.S. Cl. ..................................................... 119/109
[58] Field of Search ................................. 119/109, 106

[56]  References Cited
U.S. PATENT DOCUMENTS

| | | | |
|---|---|---|---|
| 469,254 | 2/1892 | Kelley . | |
| 2,275,983 | 3/1942 | Nadeau | 119/109 |
| 3,332,398 | 7/1967 | Mintz | 119/109 |
| 3,752,127 | 8/1973 | Baker | 119/109 |
| 3,817,218 | 6/1974 | Bon Giovanni | 119/106 |
| 3,872,833 | 3/1975 | Herbert | 119/106 |
| 3,995,598 | 12/1976 | Gardner et al. | 119/106 |
| 4,270,492 | 6/1981 | Goheen . | |
| 4,384,548 | 5/1983 | Cohn | 119/106 X |
| 4,958,597 | 9/1990 | Mildner | 119/109 |
| 5,003,929 | 4/1991 | Dean | 119/109 X |

FOREIGN PATENT DOCUMENTS

| | | | |
|---|---|---|---|
| 559918 | 7/1958 | Canada | 119/109 |
| 1233020 | 5/1960 | France | 119/109 |

Primary Examiner—Gene Mancene
Assistant Examiner—Thomas Price
Attorney, Agent, or Firm—Laurence R. Brown

[57] ABSTRACT

This invention provides a link chain animal leash that can be temporarily locked snugly about a hitching post to secure an animal in place. This is achieved by a quick open snap-lock fitting secured to the leash near its handle in a posture that permits the snap-lock mechanism to engage a chain link with the chain disposed about hitching posts of various sizes and configurations. Thus, a dog or other animal being walked on the leash can be quickly and safely secured temporarily to a hitching post when desired or necessary.

3 Claims, 1 Drawing Sheet

SECURITY HITCH FOR ANIMAL LEASHES

TECHNICAL FIELD

This invention relates to animal hitches, and more particularly it relates to adapters for converting animal leashes into hitches for tieing animals to a hitching post.

BACKGROUND ART

Animal hitches have been proposed in the prior art. Examples are H. E. Kelley U.S. Pat. No. 469,254, Feb. 23, 1892 for Cow Tie and E. E. Goheen U.S. Pat. No. 4,270,492, Jun. 2, 1981 for Quick Hitch for Animals or the like.

Each of these hitches depend upon a passing of a cross-bar toggle rod fitting attached to the end of a chain or line axially through a retention ring or cylinder of a diameter that retains the fitting when the cross bar is maintained perpendicular to the axis of the ring or cylinder. However secure hitching is not assured when there is slack in the hitching line that might allow the crossbar fitting to align axially and pass back through the retention ring or cylinder. Also, it is desirable that any fitting be self contained as an integral part of the leash or line so that it cannot be lost or misplaced, rather than being the auxiliary cylinder of U.S. Pat. No. 4,270,492.

Furthermore, with active animals jerking and pulling on a leash, a hitch about a hitching post must not only be secure so that the animal cannot get away, but also must be simply and quickly made without requiring significant manual dexterity or hitching time.

Hitches also must be adaptable to different sized hitching posts for fastening to rails, trees, fenceposts and the like which have different dimensions. The hitch should also be snug to avoid considerable slack about the hitching post in order to be held at particular heights above ground by means of a bulge in the post for example. Also, regarding health of hitched animals on a leash, neck damage can result with slack about the hitching post when it is abruptly spent by pulling on the leash.

Accordingly it is an objective of this invention to provide an improved hitchable leash for animals that is quickly adaptable to a wide range of hitching post configurations, that overcomes the foregoing problems and achieves the foregoing desiderata.

DISCLOSURE OF THE INVENTION

This invention provides an animal chain leash with a security snap fitting at the handle end of the leash for locking the chain in a loop snugly fitting about hitching posts of various configuration. Thus, if a dog, for example, being walked on a leash chain cannot enter a store, the dog can be fastened securely and quickly to a hitching post by means of a snap lock fitting carried in place for use near the handle end of the leash for looping and securing a length of the chain about the hitching post. The snap-lock fitting preferably is swivel jointed to a closed loop permanently engaging a chain link or leash end ring and thus is carried along with the chain leash at a position ready for immediate use for hitching when needed.

Other objects, features and advantages of the invention will be found throughout the following description, drawing and claims.

BRIEF DESCRIPTION OF THE DRAWINGS

Like reference characters identify similar features throughout the various views of the drawings for facilitating comparison. In the drawings.

THE PREFERRED EMBODIMENT

Figure 1:
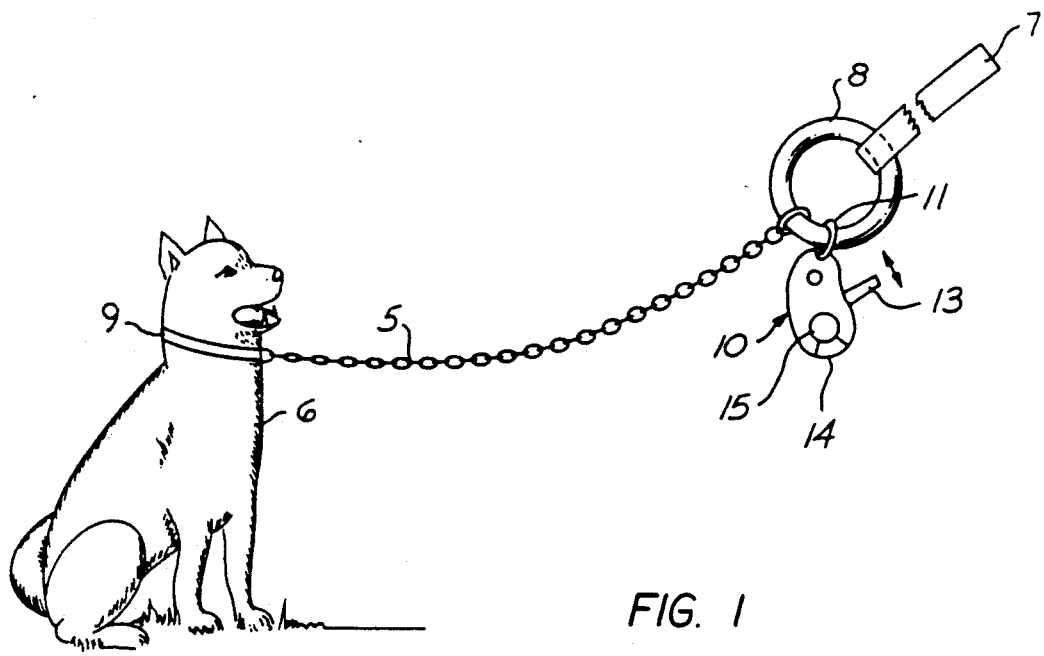
FIG. 1 is a sketch of an embodiment of the invention providing a hitching accessory on an animal leash ring disposed at the handle end of the leash.

As may be visualized from the drawings, a link chain leash 5 for an animal, such as dog 6 terminates in a fabric handle 7 coupled to the chain 5 by means of a link or loop 8. Thus, the dog 6 may be walked when the chain is attached, for example by medium of the collar 9 through a suitable loop or link (not shown). With this portion of the conventional leash, there is no way that the dog 6 can be conveniently hitched or tied to a hitching post if it has to be left outside a store for example. However, in accordance with this invention, a quick connect and disconnect snap-lock coupling link 10 is provided as a permanently attached accessory, preferably held on the loop 8 or alternatively on a chain link located near the handle 7. Thus, the coupling link 10 is attached to the leash chain 5 by way of connecting link 11. The toggle 13 as indicated by the double headed arrow can be moved back and forth to move slider arm 14 away from its shown closed spring biased stable state in order to snap open a gap about aperture 15 and permit the coupling link 10 to engage one of the chain links in chain 5 to form a closed loop.

Figure 2:
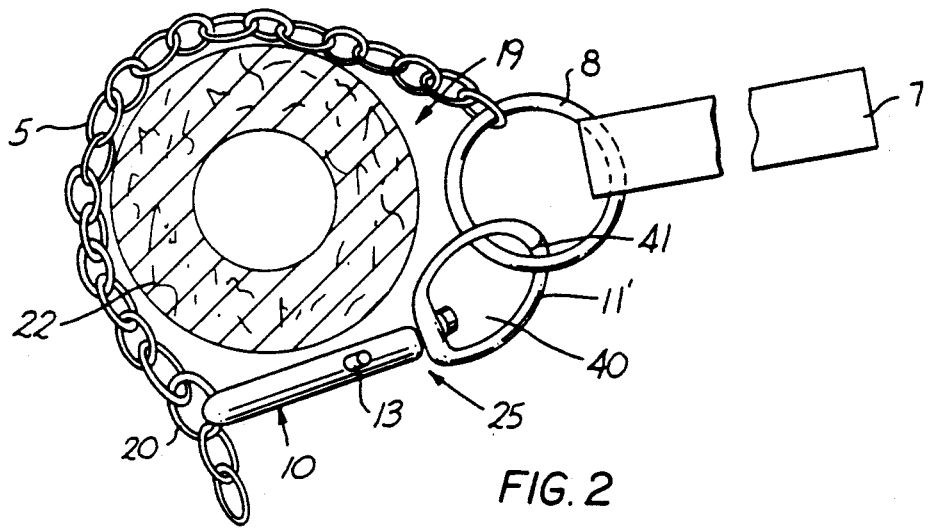
FIG. 2 is an enlarged view of a preferred swiveling snap-lock fitting that can be retrofit upon an existing leash.

The closed loop is fashioned in the manner shown more explicitly in FIG. 2. The coupling link 10, as hereinafter referred to comprises a snap-lock quick connect and disconnect fitting. Thus, the coupling link 10 is engaged with link 20 of the leash chain 5 so that a loop 19 of the chain fits snugly about the hitching post pipe 22. Without significant slack in the loop 19, the chain withstands better the forces of a lively animal on the end of the chain leash, since a snap-action impulse force produced as the slack is overcome is avoided. This construction also has the objective and advantage of fitting to various sizes and shapes of hitching posts, such as a 2 by 6 wooden beam or a water pipe, for example.

The swivel connection 25 between the chain engaging loop 26 and the chain end loop (8) engaging link 11 in the coupling link 10 advantageously hugs the hitching post as shown in FIG. 2. An even more significant objective and advantage is the facilitation of quick attachment and disconnect of the link chain 5 about the hitching post 22. Thus the chain engaging loop 26 can be more readily oriented for disposal substantially perpendicular to the plane of the chain link (20) to which it is being attached as shown in FIG. 2 for example.

Figure 3:
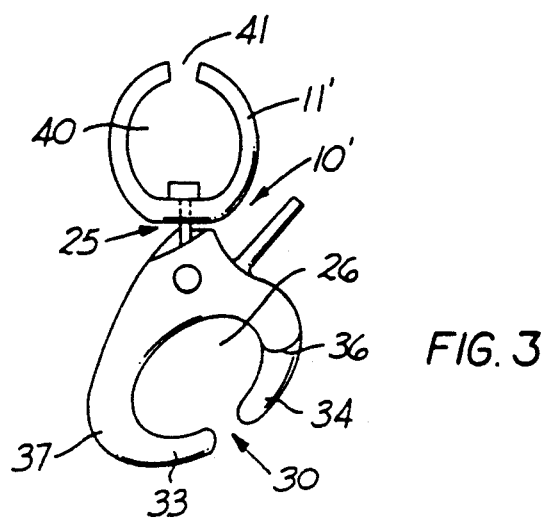
FIG. 3 is a plan view fragmental sketch illustrating the leash in use for hitching an animal to a hitching post.

In the snap-lock fitting 10 of FIG. 3, the toggle 13 is shown in a position overcoming the bias of a closure spring (not shown), thereby to snap open the gap 30 for placement of the loop 26 about a chain link before relocking the loop 26 in closed position. The half-cylindrical overlapping end portions 33, 34 mate in the stable closure position to form the closed loop by abutting at the abutments 36, 37. The permanent loop 40, which links the swivel head link 11 to the head end of the chain at loop 8, for example, is split at 41 so that the swivel link attachment 10′ may be retrofit onto a leash chain by squeezing the ends together.

Since this invention has advanced the state of the art in expediting care of animals, those novel features of the invention related to the spirit and nature of the invention are defined with particularity in the following claims.

I claim:

1. An animal leash for quick hitch to and release from a hitching post comprising in combination, a link chain assembly adapted at one end for attachment to an animal and provided at the other end with a handle for use as a leash, and a snap-lock coupling link assembly with accompanying chain link loop attached for coupling the snap lock coupling link to the chain assembly near the handle with the snap-lock coupling link thereof adapted to engage the chain assembly at various positions to form a hitching loop of selectable size in the chain for encircling a hitching post.

2. The leash defined in claim 1 wherein the snap lock coupling link further comprises a swivel mechanism between the snap-lock coupling link and the chain link loop.

3. The leash defined in claim 1 wherein said chain link loop on said snap lock coupling link further comprises a mechanism permitting the loop to be selectively attached to the chain assembly near the handle.

* * * * *